United States Patent
Awano et al.

(10) Patent No.: US 7,547,492 B2
(45) Date of Patent: Jun. 16, 2009

(54) LITHIUM COBALT OXIDE, METHOD FOR MANUFACTURING THE SAME, AND NONAQUEOUS ELECTROLYTE SECONDARY BATTERY

(75) Inventors: Hidekazu Awano, Tokyo (JP); Yoshihide Ooishi, Tokyo (JP); Nobuyuki Yamazaki, Tokyo (JP)

(73) Assignee: Nippon Chemical Industrial Co., Ltd, Tokyo (JP)

( * ) Notice: Subject to any disclaimer, the term of this patent is extended or adjusted under 35 U.S.C. 154(b) by 667 days.

(21) Appl. No.: 10/860,611

(22) Filed: Jun. 4, 2004

(65) Prior Publication Data

US 2005/0271576 A1    Dec. 8, 2005

(51) Int. Cl.
*H01M 4/58* (2006.01)
*C01G 51/04* (2006.01)

(52) U.S. Cl. .............. 429/231.3; 429/128.1; 423/594.5

(58) Field of Classification Search .............. 429/218.1, 429/231.95, 231.3; 423/594.5
See application file for complete search history.

(56) References Cited

U.S. PATENT DOCUMENTS 7,374,841 B2 * 5/2008 Hosoya et al. ........... 429/231.1

FOREIGN PATENT DOCUMENTS

| JP | 2001-85009 A | 3/2001 |
| JP | 2001-135313 A | 5/2001 |
| JP | 2001-155729 A | 6/2001 |

* cited by examiner

*Primary Examiner*—Patrick Ryan
*Assistant Examiner*—Julian Mercado
(74) *Attorney, Agent, or Firm*—Smith Patent Office

(57) ABSTRACT

Lithium cobalt oxide, which can provide a nonaqueous electrolyte secondary battery having an excellent initial capacity and an excellent capacity retention, and a method for manufacturing the same are provided. The lithium cobalt oxide has a tap density of at least 1.7 g/cm$^3$ and a pressed density of 3.5 to 4.0 g/cm$^3$. A method for manufacturing the lithium cobalt oxide includes the step of selecting a lithium cobalt oxide (A) and a lithium cobalt oxide (B) so that a difference in the tap density between the lithium cobalt oxide (A) and the lithium cobalt oxide (B) is at least 0.2 g/cm$^3$; and mixing the lithium cobalt oxide (A) and the lithium cobalt oxide (B).

13 Claims, 4 Drawing Sheets

LITHIUM COBALT OXIDE, METHOD FOR MANUFACTURING THE SAME, AND NONAQUEOUS ELECTROLYTE SECONDARY BATTERY

BACKGROUND OF THE INVENTION

1. Field of the Invention

The present invention relates to lithium cobalt oxide, a method for manufacturing the same, and a nonaqueous electrolyte secondary battery provided with a cathode plate including the lithium cobalt oxide as a cathode active material.

2. Description of the Related Art

In recent years, nonaqueous electrolyte secondary batteries, such as lithium ion secondary batteries, have become in practical use as power sources for small electronic equipment, e.g., laptop personal computers, cellular phones, and video cameras, in accordance with rapid advance of portable and cordless electronic equipment intended for home use.

With respect to these lithium ion secondary batteries, since lithium cobalt oxide is useful as a cathode active material for the lithium ion secondary battery, research has been actively conducted on lithium-based complex oxides, and many proposes have been made regarding compounds, e.g., lithium cobalt oxide, lithium nickel oxide, and lithium manganese oxide, as cathode active materials until now.

Various proposes for improving the performances of those cathode active materials have been made, and many technologies regarding the apparent density, the pressed density, and the like are disclosed as important factors.

For example, a cathode active material has been proposed, wherein the tap density of $Li_pMO_2$ containing granular composition prepared by firing at least two types of starting materials having different average particle diameters is at least 2.65 g/cm$^3$ (referred to, for example, the front page of Japanese Unexamined Patent Application Publication No. 2001-85009).

Another cathode active material for a nonaqueous electrolyte secondary battery has been proposed, wherein with respect to a cathode active material used for a nonaqueous electrolyte secondary battery including lithium cobalt oxide represented by a formula, $LiCoO_2$. The above-described lithium cobalt oxide is composed of spherical or ellipsoidal secondary particles which have a Feret diameter of projection pattern of 0.1 to 4 μm on a SEM observation basis and in which many small crystalline primary particles have gathered while the primary particles have an average particle diameter of 2 μm or less. The tap density of the above-described lithium cobalt oxide is at least 2.2 g/cm$^3$ (referred to, for example, the front page of Japanese Unexamined Patent Application Publication No. 2001-135313).

Another cathode active material for a nonaqueous electrolyte secondary battery has been proposed, wherein the cathode active material includes lithium cobalt oxide composed of secondary particles in which many fine primary particles of lithium cobalt oxide subsequently represented by a general formula, $LiCoO_2$, have gathered while the secondary particle has many fine gaps capable of being impregnated with an electrolytic solution, and the lithium cobalt oxide has a tap density of at least 2.2 g/cm$^3$ (referred to, for example, the front page of Japanese Unexamined Patent Application Publication No. 2001-155729).

However, any nonaqueous electrolyte secondary battery including the above-described lithium cobalt oxide as a cathode active material does not simultaneously satisfy the discharge capacity and the quick charge-discharge performance under present circumstances. Therefore, various attempts have been conducted. For example, it has been attempted to change the particle diameter and the shape of particle in order to increase the electrode density and, thereby, increase the battery capacity and in order to improve the quick charge-discharge performance. However, satisfactory results have not yet been achieved.

SUMMARY OF THE INVENTION

The present invention has been made in consideration of the above-described problems in known technologies. Accordingly, it is an object of the present invention to provide lithium cobalt oxide having excellent powder properties, allowing the electrode density to become high, and allowing a battery prepared by using the lithium cobalt oxide to have a large discharge capacity and excellent quick charge-discharge performance, to provide a method for manufacturing the same, and to provide a nonaqueous electrolyte secondary battery including the lithium cobalt oxide.

The inventors of the present invention found out that in the case where lithium complex oxide particles were used as the cathode active material, when the particle properties were specified and, in addition, lithium complex oxide particles having different particle diameters were blended, the most of the properties of the particles was able to be exerted. Consequently, the present invention has been completed.

The present invention relates to lithium cobalt oxide having a tap density of at least 1.7 g/cm$^3$ and a pressed density of 3.5 to 4.0 g/cm$^3$.

Preferably, the lithium cobalt oxide of the present invention is a mixture of lithium cobalt oxide (A) composed of monodisperse primary particles and lithium cobalt oxide (B) composed of aggregated primary particles, and the mixture has a tap density of at least 1.7 g/cm$^3$ and a pressed density of 3.5 to 4.0 g/cm$^3$.

The present invention relates to a method for manufacturing the above-described lithium cobalt oxide, the method including the step of mixing lithium cobalt oxide (A) having a tap density of 1.7 to 3.0 g/cm$^3$ and lithium cobalt oxide (B) having a tap density of 1.0 to 2.0 g/cm$^3$, wherein these are combined in order that the difference in tap density is at least 0.20 g/cm$^3$ between the above-described lithium cobalt oxide (A) and the above-described lithium cobalt oxide (B).

Preferably, the above-described lithium cobalt oxide (A) and the lithium cobalt oxide (B) are mixed at a ratio of (A):(B)=95:5 to 60:40 on a weight basis.

Preferably, the above-described lithium cobalt oxide (A) is composed of monodisperse primary particles, and the above-described lithium cobalt oxide (B) is composed of aggregated primary particles.

Preferably, the above-described lithium cobalt oxide (A) has an average particle diameter of 5 to 30 μm, and the above-described lithium cobalt oxide (B) has an average particle diameter of 0.1 to 10 μm.

Furthermore, the present invention relates to a nonaqueous electrolyte secondary battery provided with a cathode plate configured by the use of the above-described lithium cobalt oxide as a cathode active material.

The lithium cobalt oxide of the present invention can have a high pressed density and an appropriate tap density by mixing two different types of lithium cobalt oxide, and when it is used as a cathode active material for a cathode plate, the effect of increasing the electrode density is exerted.

According to the manufacturing method of the present invention, the above-described lithium cobalt oxide serving a useful function as a cathode active material can readily be provided.

Furthermore, according to the present invention, a nonaqueous electrolyte secondary battery which exhibits high degree of safety and has excellent quick charge-discharge performance can be provided by the use of the above-described lithium cobalt oxide as a cathode active material.

DETAILED DESCRIPTION OF THE PREFERRED EMBODIMENTS

Figure 1:
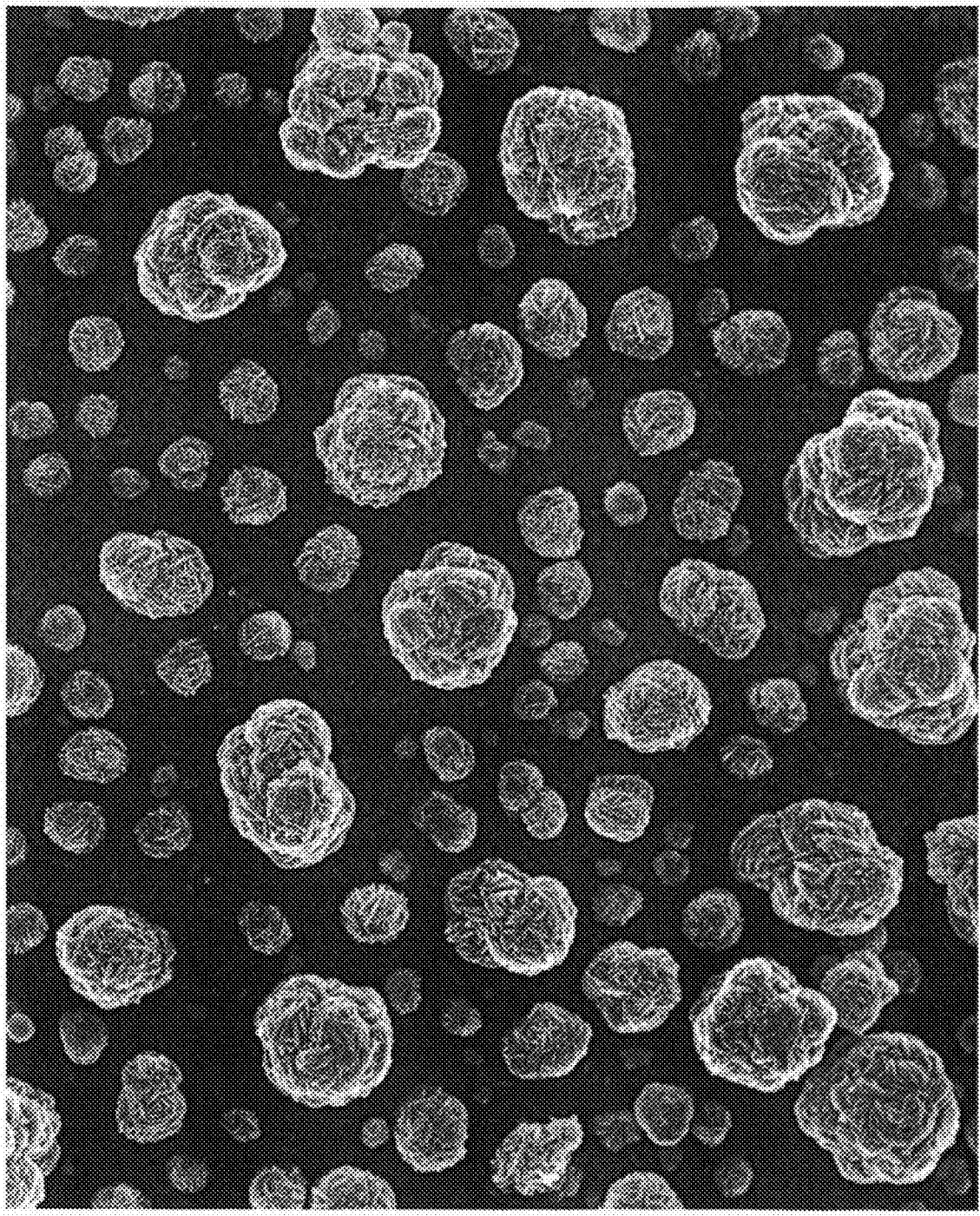
FIG. 1 is a SEM photograph (magnification 3,000 times) showing the particle structure of the lithium cobalt oxide (A) composed of uniformly monodisperse primary particles, in Manufacturing Example 1.

Lithium cobalt oxide of the present invention has a tap density of at least 1.7 g/cm$^3$ and a pressed density of 3.5 to 4.0 g/cm$^3$.

The above-described lithium cobalt oxide is composed of a mixture of at least two compounds selected from the compounds represented by a general formula (1), $Li_aCoO_2$ (in the formula, a represents a number within the range of $0.2 \leq a \leq 1.2$), or a mixture of a compound represented by a general formula (1), $Li_aCoO_2$, and a compound represented by a general formula (2), $Li_aCo_{1-y}M_yO_{2-z}$ (in the formula, "M" represents at least one element selected from the group consisting of transition metal elements other than Co and elements having an atomic number of at least 9, "a" represents a number within the range of $0.2 \leq a \leq 1.2$, "y" represents a number within the range of $0 < y \leq 0.4$, and "z" represents a number within the range of $0 \leq z \leq 1.0$).

Specifically, other metal elements "M" may substitute a part of $Li_aCoO_2$ or a part of Co in $Li_aCoO_2$. The metal element "M" is at least one element selected from the group consisting of transition metal elements other than Co and elements having an atomic number of at least 9, and is at least one element selected from, for example, Na, Mg, Al, Ca, Ti, V, Cr, Mn, Fe, Ni, Zn, Si, Ga, Zr, Nb, W, and Mo.

Alternatively, a surface of lithium cobalt oxide where other metal elements "M" have been substituted for a part of $Li_aCoO_2$ or a part of Co in $Li_aCoO_2$ may be coated with a sulfate.

In general, a tap density indicates a natural packing property of a mixed powder of coarse particles and fine particles without being pressurized intentionally. A pressed density indicates a packing property of coarse particles and fine particles under pressure. The present invention is based on a finding that lithium cobalt oxide having a tap density and a pressed density each within a specific range is important when the lithium cobalt oxide is used as a cathode active material of a nonaqueous electrolyte secondary battery.

It is desirable that the tap density of the lithium cobalt oxide of the present invention is at least 1.7 g/cm$^3$, preferably is 2.0 to 3.0 g/cm$^3$.

It is desirable that the pressed density of the lithium cobalt oxide of the present invention is 3.5 to 4.0 g/cm$^3$, preferably is 3.6 to 4.0 g/cm$^3$, and further preferably is 3.7 to 4.0 g/cm$^3$.

The lithium cobalt oxide of the present invention has a tap density and a pressed density within the above-described ranges and, thereby, has excellent properties as the cathode active material.

A method for manufacturing the lithium cobalt oxide of the present invention will now be described.

In this manufacturing method, the lithium cobalt oxide of the present invention may be produced by dry mixing of at least two types of lithium cobalt oxide having different tap densities.

Specifically, the method for manufacturing the lithium cobalt oxide according to the present invention includes the step of mixing lithium cobalt oxide (A) having a tap density of 1.7 to 3.0 g/cm$^3$ and lithium cobalt oxide (B) having a tap density of 1.0 to 2.0 g/cm$^3$, wherein these are selected in order that the difference in tap density is at least 0.20 g/cm$^3$ between the above-described lithium cobalt oxide (A) and the above-described lithium cobalt oxide (B).

Preferably, the above-described lithium cobalt oxide (A) and the lithium cobalt oxide (B) are mixed at a ratio of (A):(B)=95:5 to 60:40 on a weight basis, and preferably at a ratio of 90:10 to 80:20.

The lithium cobalt oxide (A) to be used may have a tap density of 1.7 to 3.0 g/cm$^3$, and preferably of 2.0 to 3.0 g/cm$^3$.

The lithium cobalt oxide (B) to be used may have a tap density of 1.0 to 2.0 g/cm$^3$, and preferably of 1.0 to 1.7 g/cm$^3$.

Preferably, the lithium cobalt oxide (A) and (B) to be used have different tap densities, and it is desirable that the difference in tap density between the above-described lithium cobalt oxide (A) and (B) is at least 0.20 g/cm$^3$, and preferably is at least 0.30 g/cm$^3$.

Preferably, the lithium cobalt oxide (A) is composed of monodisperse primary particles. The monodisperse primary particles refer to particles of a minimum size that are present independently of each other, and specifically, this is checked by a scanning electron microscope (SEM) photograph observation. A powder in which monodisperse particles constitute at least 80 percent of the field of view provided by SEM may be referred to as a monodisperse powder. FIG. 1 is a SEM photograph (magnification 3,000 times) showing the particle structure of the lithium cobalt oxide (A) composed of uniformly monodisperse primary particles, in Manufacturing Example 1.

It is desirable that the average particle diameter of the above-described lithium cobalt oxide (A) is within the range of 5 to 30 μm, and preferably is within the range of 10 to 20 μm. The lithium cobalt oxide (A) is composed of coarse particles compared with the lithium cobalt oxide (B).

Figure 2:
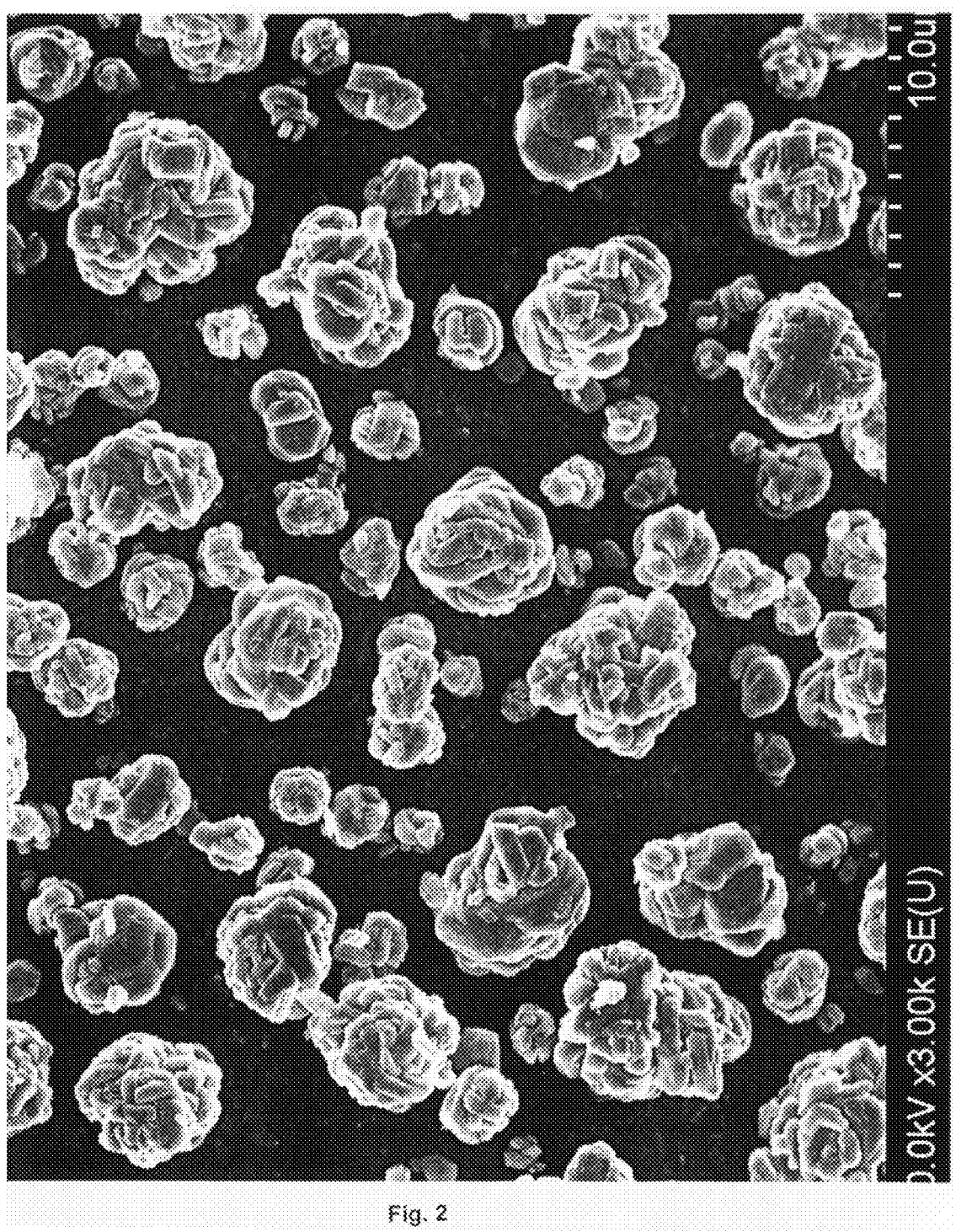
FIG. 2 is a SEM photograph (magnification 3,000 times) showing the particle structure of the lithium cobalt oxide (B) composed of aggregated primary particles, in Manufacturing Example 7.

Preferably, the lithium cobalt oxide (B) is composed of secondary particles while a secondary particle is formed by aggregation of the primary particles. The phrase "a secondary particle is formed by aggregation of primary particles" refers to a state in which particles of minimum size are mutually attracted by van der Waals forces and surface charge forces and, thereby, form the shape of a particle. Specifically, this is checked by a SEM photograph observation. A powder in which aggregated particles constitute at least 80 percent of the field of view provided by SEM may be referred to as an aggregated powder. FIG. 2 is a SEM photograph (magnification 3,000 times) showing the particle structure of the lithium cobalt oxide (B) composed of aggregated primary particles, in Manufacturing Example 7.

It is desirable that the average particle diameter of the above-described lithium cobalt oxide (B) is within the range of 0.1 to 10 μm, and preferably is within the range of 2.0 to 8.0 μm.

The average particle diameter in the present invention indicates a value at 50 percent ($D_{50}$) of the cumulative particle size distribution provided by a laser scattering particle size distribution analyzer.

In the present invention, when the lithium cobalt oxide prepared by mixing the lithium cobalt oxide (B) composed of aggregated primary particles and the lithium cobalt oxide (A) composed of monodisperse primary particles is used as a cathode active material of a nonaqueous electrolyte secondary battery, excellent battery properties are exhibited. The reason for this is not clear, but it is believed that the mixture of the above-described particles increases the packing density on the cathode plate. In addition, the aggregated particles exhibit excellent quick charge-discharge performance, while the monodisperse particles ensure a high degree of safety.

Furthermore, in the manufacturing method of the present invention, preferably, the above-described lithium cobalt oxide (A) is a compound represented by a general formula (1), $Li_aCoO_2$ (in the formula, "a" represents a number within the range of $0.2 \leq a \leq 1.2$). Preferably, the above-described lithium cobalt oxide (B) is a compound represented by the above-described general formula (1) or a compound represented by a general formula (2), $Li_aCo_{1-y}M_yO_{2-z}$ (in the formula, "M" represents at least one element selected from the group consisting of transition metal elements other than Co and elements having an atomic number of at least 9, "a" represents a number within the range of $0.2 \leq a \leq 1.2$, "y" represents a number within the range of $0 < y \leq 0.4$, and "z" represents a number within the range of $0 \leq z \leq 1.0$).

The lithium cobalt oxide of the present invention may be produced by uniformly mixing at least two types of lithium cobalt oxide having different tap densities and average particle diameters. A method used for uniform mixing is not specifically limited as long as the method is in practical use in the industry. Examples thereof include methods through the use of, for example, rotary vessel type mixers, e.g., horizontal cylinder type, V Type, and double-circular cone type, and fixed vessel type mixers, e.g., ribbon type, horizontal screw type, paddle type, vertical ribbon type, muller type, planetary motion type, static mixer, uniaxial rotor type, Henschel mixer, and Flo Jet mixer.

As the positive active material for a lithium secondary battery of cell, the lithium cobalt oxide compound described above is used. The positive active material is one of the stating materials for a positive electrode compound of a lithium secondary cell. The positive electrode compound, which will be described later, is a mixture formed of the positive active material, a conductive agent, a binder, filler whenever necessary, and the like. Since the positive active material of the lithium secondary cell, according to the present invention, is formed of the lithium cobalt compound oxide described above, kneading with the other starting materials can be easily performed when the positive electrode compound is prepared. In addition, coating of a positive electrode collector with the positive electrode compound thus obtained can also be easily performed.

The lithium secondary cell of the present invention uses the lithium cobalt oxide compound as a positive active material and comprises a positive electrode, a negative electrode, separators, and a non-aqueous electrolyte containing a lithium salt. The positive electrode is formed, for example, by applying a positive electrode compound onto a positive electrode collector, followed by drying, and the positive electrode compound is composed of a positive active material, a conductive agent, a binder, and filler whenever necessary, and the like.

A material for the positive electrode collector is not particularly limited as long it is inactive in an assembled cell in view of the chemical reaction. For example, the material may be mentioned stainless steel, nickel, aluminum, titanium, baked carbon, and aluminum or stainless steel surface-treated with carbon, nickel, titanium, or silver.

As the conductive agent, for example, conductive materials may include materials such as graphite including natural graphite and manmade graphite, carbon black, acetylene black, carbon fiber, carbon nanotube, and metal such as powdered nickel. As the natural graphite, for example, scaly graphite, flake graphite, and earthy graphite may be mentioned. The conductive agents as mentioned above may be used alone or in combination. The content of the conductive agent in the positive electrode compound is 1 to 50 percent by weight and preferably 2 to 30 percent by weight.

As the binder, for example, the following compounds may be used polysaccharides, thermoplastic resins, and polymers having elasticity, such as poly(vinylidene fluoride), poly(vinyl chloride), carboxylmethylcellulose, hydroxylpropylcellulose, recycled cellulose, diacetylcellulose, poly(vinyl pyrrolidone), ethylene-propylene-diene-terpolymer (EPDM), sulfonated EPDM, styrene-butadiene rubber, fluorinated rubber, and polyethylene oxide. The binders as mentioned above may be used alone or in combination. The content of the binder in the positive electrode compound is 2 to 30 percent by weight and preferably 5 to 15 percent by weight.

The filler of the positive electrode compound has a function of suppressing the volume expansion or the like of the positive electrode and is used whenever it is necessary. As the filler, any fiber materials may be used as long they are inactive in an assembled cell in view of the chemical reaction. For example, fibers made of olefinic polymers such as polypropylene and polyethylene, glass fibers, and carbon fibers may be used. The content of the filler is not particularly limited and is preferably 0 to 30 percent by weight of the positive electrode compound.

The negative electrode is formed by applying a negative electrode material onto a negative electrode collector, followed by drying. As the negative electrode collector, any material may be used as long as being inactive in an assembled cell in view of the chemical reaction. For example, there may be mentioned stainless steel, nickel, copper, titanium, aluminum, baked carbon, copper or stainless steel surface-treated with carbon, nickel, titanium, or silver, and aluminum-cadmium alloy.

The negative electrode material is not particularly limited, and for example, may include carbonaceous materials, metal composite oxides, metal lithium, and lithium alloys. As the carbonaceous material, for example, hard-graphitized carbon materials and graphite-based carbon materials may be mentioned. As the metal composite oxide, for example, there may be mentioned a compound represented $SnM^1_{1-x}M^2_yO_z$ (where, "$M^1$" is at least one element selected from the group consisting of Mn, Fe, Pb, and Ge; "$M^2$" is at least one element selected from the group consisting of Al, B, P, Si, elements of group I, II, and III of the periodic table, and halogen atoms; and $0<x \leq 1$, $1 \leq y \leq 3$, and $1 \leq z \leq 8$ are satisfied).

As the separator, an insulating thin film having a high ion transmittance and a predetermined mechanical strength is used. Sheets and nonwoven cloths may be used which are made of glass fibers or an olefinic polymer, such as polyethylene or polypropylene, having organic-solvent resistance and hydrophobic properties. The pore diameter of the separator is not particularly limited as long as it is effectively used for a general cell application and is, for example, 0.01 to 10 μm. The thickness of the separator may be in the range used for a general cell application and is, for example, 5 to 300 μm. In addition, in the case in which a solid electrolyte such as a polymer is used as described later, the solid electrolyte may also be used as the separator. In addition, in order to improve charge and discharge properties, a compound such as pyridine, triethyl phosphite, or triethanolamine may be added to the electrolyte.

The non-aqueous electrolyte containing a lithium salt is a mixture of a non-aqueous electrolyte and a lithium salt. As the non-aqueous electrolyte, a non-aqueous electrolyte or an organic solid electrolyte is used. As the non-aqueous electrolyte, for example, there may be mentioned aprotic organic solvents such as N-methyl-2-pyrrolidinone, propylene carbonate, ethylene carbonate, butylene carbonate, dimethyl carbonate, diethyl carbonate, (-butyrolactone, 1,2-dimethoxyethane, tetrahydrofuran, 2-methyl tetrahydrofuran, dimethyl sulfoxide, 1,3-dioxolane, formamide, dimethyl formamide, dioxolane, acetonitrile, nitromethane, methyl formate, methyl acetate, a phosphoric acid triester, trimethoxymethane, a dioxolane derivative, sulfolane, 3-methyl-2-oxazolidinone, a propylene carbonate derivative, a tetrahydrofuran derivative, diethyl ether, and 1,3-propanesultone. Those compounds mentioned above may be used alone or in combination.

As the organic solid electrolyte, for example, a polyethylene derivative, a polymer including the same, a propylene oxide derivative, a polymer including the same, and a phosphate polymer may be mentioned. As the lithium salt, a material dissolved in the non-aqueous electrolyte described above is used, and for example, $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, $LiAlCl_4$, chloroboron lithium, a lithium lower aliphatic carboxylate, and lithium tetraphenylborate may be used alone or in combination.

The shape of the lithium secondary cell of the present invention may be a button, sheet, cylinder, rectangle, or the like. The application of the secondary cell of the present invention is not particularly limited and may be applied to electronic apparatuses, such as notebook personal computers, laptop personal computers, pocket type word processors, mobile phones, cordless phone handsets, portable CD players, and radios, and consumer electronic apparatuses for automobiles, electric vehicles, and game machines. In addition, the lithium secondary cell is categorized as a non-aqueous electrolyte secondary cell.

The present invention provides portable electronic apparatuses incorporating the non-aqueous electrolyte secondary cell described above. As the portable electronic apparatuses, for example, notebook personal computers, pocket type word processors, mobile phones, cordless phone handsets, portable CD players, radios, and game machines may be used.

EXAMPLES

The present invention will be described below in further detail with reference to the examples.

In the examples, a cathode active material and a nonaqueous electrolyte secondary battery of the present invention will be described.

(1) Method for Measuring Tap Density

A graduated cylinder is dried completely, and the weight of the empty graduated cylinder is measured. Approximately 70 g of sample is weighed on weighing paper. The sample is transferred into the graduated cylinder by using a funnel. The graduated cylinder is set in an automated TD analyzer (Dual Autotap produced by YUASA-IONICS COMPANY, LIMITED), the number of taps is set at 500, and tapping is performed. The tap is raised to 3.2 mm above the sample, and the tapping pace is 200 times/min (in accordance with ASTM: B527-93, 85). After the 500 taps are completed, the scale at the level of the sample surface is read, the weight of the graduated cylinder including the sample is measured and, thereby, a tap density is calculated.

(2) Method for Measuring Pressed Density

A sample is put in a mold of 15 mm in diameter, pressing (Hand Press; Type WPN-10, produced by ToYo Shoko) of $1.96 \times 10^8$ Pa (2 ton/cm$^2$) is performed for 1 minute, so that a pellet is prepared. Subsequently, the weight and the volume of the resulting pellet are measured, the density of the pellet is calculated, and this is taken as a pressed density.

Manufacturing Example 1

Lithium carbonate and cobalt oxide were weighed in order so that the Li/Co atomic ratio became 1.02, and they were adequately mixed in a mortar, so that a uniform mixture was prepared. The resulting mixture was filled in an alumina crucible, and was put in an electric furnace. The temperature was raised in the atmosphere, and a firing treatment was performed by keeping the mixture at a temperature of 700° C. to 1,000° C. for 10 hours. The resulting fired material was cooled in the air and, thereafter, grinding and classification were performed, so that lithium cobalt oxide (LiCoO2) having an average particle diameter of 15.5 μm, a tap density of 2.80 g/cm$^3$, and a pressed density of 3.45 g/cm$^3$ was prepared.

The resulting lithium cobalt oxide was a lithium cobalt oxide (A-1) composed of uniformly monodisperse primary particles.

Manufacturing Example 2

As described in Manufacturing Example 1, lithium carbonate and cobalt oxide were mixed in order so that the Li/Co atomic ratio became 1.04 and, thereby, a uniform mixture was prepared. A firing treatment was performed at 1,000° C. to 1,050° C. for 10 hours, so that lithium cobalt oxide (LiCoO$_2$) having an average particle diameter of 12.3 μm, a tap density of 2.50 g/cm$^3$, and a pressed density of 3.48 g/cm$^3$ was prepared.

The SEM image of the resulting lithium cobalt oxide indicated that a lithium cobalt oxide (A-2) was composed of uniformly monodisperse primary particles.

Manufacturing Example 3

As described in Manufacturing Example 1, lithium carbonate and cobalt oxide were mixed in order so that the Li/Co atomic ratio became 1.02 and, thereby, a uniform mixture was prepared. Firing was performed at 1,000° C. to 1,050° C. for 10 hours, so that lithium cobalt oxide having an average particle diameter of 7.8 μm, a tap density of 1.90 g/cm$^3$, and a pressed density of 3.41 g/cm$^3$ was prepared. The resulting lithium cobalt oxide was a lithium cobalt oxide (A-3) composed of uniformly monodisperse primary particles.

Manufacturing Example 4

As described in Manufacturing Example 1, lithium carbonate and cobalt oxide were mixed in order so that the Li/Co atomic ratio became 1.00 and, thereby, a uniform mixture was prepared. A firing treatment was performed at 900° C. to 1,000° C. for 10 hours, so that lithium cobalt oxide (LiCoO$_2$) having an average particle diameter of 7.4 μm, a tap density of 1.80 g/cm$^3$, and a pressed density of 3.20 g/cm$^3$ was prepared.

The resulting lithium cobalt oxide was a lithium cobalt oxide (B-1) composed of aggregated primary particles.

Manufacturing Example 5

As described in Manufacturing Example 1, lithium carbonate and cobalt oxide were mixed in order so that the Li/Co atomic ratio became 1.00 and, thereby, a uniform mixture was prepared. A firing treatment was performed at 900° C. to 1,000° C. for 10 hours, so that lithium cobalt oxide (LiCoO$_2$) having an average particle diameter of 5.2 μm, a tap density of 1.50 g/cm$^3$, and a pressed density of 3.15 g/cm$^3$ was prepared.

The resulting lithium cobalt oxide was a lithium cobalt oxide (B-2) composed of aggregated primary particles.

Manufacturing Example 6

As described in Manufacturing Example 1, lithium carbonate and cobalt oxide were mixed in order so that the Li/Co atomic ratio became 1.00 and, thereby, a uniform mixture was prepared. A firing treatment was performed at 800° C. to 900° C. for 10 hours, so that lithium cobalt oxide (LiCoO$_2$) having an average particle diameter of 3.2 μm, a tap density of 1.20 g/cm$^3$, and a pressed density of 3.21 g/cm$^3$ was prepared.

The SEM image of the resulting lithium cobalt oxide indicated that a lithium cobalt oxide (B-3) was composed of aggregated primary particles.

Manufacturing Example 7

In a manner similar to that in Manufacturing Example 1, LiCo$_{0.98}$Al$_{0.02}$O$_2$ was synthesized, in which 2 mole percent of Al was added relative to Co. The firing method was similar to that in Manufacturing Example 1. Mixing was performed in a mortar in order that 2 mole percent of Al(OH)$_3$ was included relative to Co and, thereafter, firing was performed at 800° C. to 900° C., so that lithium cobalt oxide (LiCo$_{0.98}$Al$_{0.02}$O$_2$) was prepared.

The resulting lithium cobalt oxide had an average particle diameter of 2.8 μm, a tap density of 1.18 g/cm$^3$, and a pressed density of 3.19 g/cm$^3$.

The SEM image of the resulting lithium cobalt oxide indicated that a lithium cobalt oxide (B-4) was composed of aggregated primary particles.

FIG. 1 is a SEM photograph (magnification 3,000 times) showing the particle structure of the lithium cobalt oxide (A) composed of uniformly monodisperse primary particles, in Manufacturing Example 1.

FIG. 2 is a SEM photograph (magnification 3,000 times) showing the particle structure of lithium cobalt oxide (B) composed of aggregated primary particles, in Manufacturing Example 7.

The lithium cobalt oxide (A) and (B) prepared in the above-described Manufacturing Examples 1 to 7 are collectively shown in Table 1.

TABLE 1

| Lithium cobalt oxide | | | Average particle diameter (μm) | Tap density (g/cm$^3$) | Pressed density (g/cm$^3$) |
| --- | --- | --- | --- | --- | --- |
| Manufacturing Example 1 | A-1 | Monodispersion | 15.50 | 2.80 | 3.45 |
| Manufacturing Example 2 | A-2 | Monodispersion | 12.30 | 2.50 | 3.48 |
| Manufacturing Example 3 | A-3 | Monodispersion | 7.80 | 1.90 | 3.41 |
| Manufacturing Example 4 | B-1 | Aggregation | 7.40 | 1.80 | 3.20 |
| Manufacturing Example 5 | B-2 | Aggregation | 5.20 | 1.50 | 3.15 |
| Manufacturing Example 6 | B-3 | Aggregation | 3.20 | 1.20 | 3.21 |
| Manufacturing Example 7 | B-4 | Aggregation | 2.80 | 1.18 | 3.19 |

(Note) In Table 1, A represents lithium cobalt oxide (A), and B represents lithium cobalt oxide (B).

It is desirable that the pressed density of the lithium cobalt oxide (A) in the present invention is 3.3 to 3.7 g/cm$^3$, and preferably is 3.5 to 3.7 g/cm$^3$. It is desirable that the pressed density of the lithium cobalt oxide (B) in the present invention is 3.1 to 3.5 g/cm$^3$, and preferably is 3.1 to 3.3 g/cm$^3$.

In the present invention, it is desirable that the difference in pressed density between the lithium cobalt oxide (A) and the lithium cobalt oxide (B) is at least 0.2 g/cm$^3$, and preferably is 0.8 to 1.5 g/cm$^3$.

Example 1

Lithium cobalt oxide was prepared by uniformly mixing 95 parts by weight of lithium cobalt oxide (A-1) having an average particle diameter of 15.5 μm and a tap density of 2.80 g/cm$^3$, prepared in Manufacturing Example 1, and 5 parts by weight of lithium cobalt oxide (B-3) having an average particle diameter of 3.2 μm and a tap density of 1.20 g/cm$^3$, prepared in Manufacturing Example 6, with a small ribbon mixer. The resulting lithium cobalt oxide had an average particle diameter of 15.0 μm, a tap density of 2.75 g/cm$^3$, and a pressed density of 3.65 g/cm$^3$.

Example 2

Lithium cobalt oxide was prepared by uniformly mixing 70 parts by weight of lithium cobalt oxide (A-1) having an average particle diameter of 15.5 μm and a tap density of 2.80 g/cm$^3$, prepared in Manufacturing Example 1, and 30 parts by weight of lithium cobalt oxide (B-3) having an average particle diameter of 3.2 μm and a tap density of 1.20 g/cm$^3$, prepared in Manufacturing Example 6. The resulting lithium cobalt oxide had an average particle diameter of 11.9 μm, a tap density of 2.40 g/cm$^3$, and a pressed density of 3.92 g/cm$^3$.

Example 3

Lithium cobalt oxide was prepared by uniformly mixing 70 parts by weight of lithium cobalt oxide (A-1) having an average particle diameter of 15.5 μm and a tap density of 2.80 g/cm$^3$, prepared in Manufacturing Example 1, and 30 parts by weight of lithium cobalt oxide (B-2) having an average particle diameter of 5.2 μm and a tap density of 1.50 g/cm$^3$, prepared in Manufacturing Example 5. The resulting lithium cobalt oxide had an average particle diameter of 12.8 μm, a tap density of 2.53 g/cm$^3$, and a pressed density of 3.82 g/cm$^3$.

Example 4

Lithium cobalt oxide was prepared by uniformly mixing 80 parts by weight of lithium cobalt oxide (A-2) having an average particle diameter of 12.3 μm and a tap density of 2.50 g/cm³, prepared in Manufacturing Example 2, and 20 parts by weight of lithium cobalt oxide (B-2) having an average particle diameter of 5.2 μm and a tap density of 1.50 g/cm³, prepared in Manufacturing Example 5. The resulting lithium cobalt oxide had an average particle diameter of 10.5 μm, a tap density of 2.40 g/cm³, and a pressed density of 3.75 g/cm³.

Example 5

Lithium cobalt oxide was prepared by uniformly mixing 60 parts by weight of lithium cobalt oxide (A-2) having an average particle diameter of 12.3 μm and a tap density of 2.50 g/cm³, that was prepared in Manufacturing Example 2, and 40 parts by weight of lithium cobalt oxide (B-1) having an average particle diameter of 7.4 μm and a tap density of 1.80 g/cm³, prepared in Manufacturing Example 4. The resulting lithium cobalt oxide had an average particle diameter of 10.1 μm, a tap density of 2.35 g/cm³, and a pressed density of 3.65 g/cm³.

Example 6

Lithium cobalt oxide was prepared by uniformly mixing 85 parts by weight of lithium cobalt oxide (A-3) having an average particle diameter of 7.8 μm and a tap density of 1.90 g/cm³, prepared in Manufacturing Example 3, and 15 parts by weight of lithium cobalt oxide (B-3) having an average particle diameter of 3.2 μm and a tap density of 1.20 g/cm³, prepared in Manufacturing Example 6. The resulting lithium cobalt oxide had an average particle diameter of 7.0 μm, a tap density of 1.83 g/cm³, and a pressed density of 3.55 g/cm³.

Example 7

Lithium cobalt oxide was prepared by uniformly mixing 60 parts by weight of lithium cobalt oxide (A-1) having an average particle diameter of 15.5 μm and a tap density of 2.80 g/cm³, prepared in Manufacturing Example 1, and 40 parts by weight of lithium cobalt oxide (B-3) having an average particle diameter of 3.2 μm and a tap density of 1.20 g/cm³, prepared in Manufacturing Example 6. The resulting lithium cobalt oxide had an average particle diameter of 7.8 μm, a tap density of 1.88 g/cm³, and a pressed density of 3.50 g/cm³.

Example 8

Lithium cobalt oxide was prepared by uniformly mixing 70 parts by weight of lithium cobalt oxide (A-1) having an average particle diameter of 15.5 μm and a tap density of 2.80 g/cm³, prepared in Manufacturing Example 1, and 30 parts by weight of Al-containing lithium cobalt oxide ($LiCo_{0.98}Al_{0.02}O_2$) (B-4) having an average particle diameter of 2.8 μm and a tap density of 1.18 g/cm³, prepared in Manufacturing Example 7. The resulting lithium cobalt oxide had an average particle diameter of 7.7 μm, a tap density of 2.38 g/cm³, and a pressed density of 3.89 g/cm³.

Example 9

Lithium cobalt oxide was prepared by uniformly mixing 90 parts by weight of lithium cobalt oxide (A-1) having an average particle diameter of 15.5 μm and a tap density of 2.80 g/cm³, prepared in Manufacturing Example 1, and 10 parts by weight of lithium cobalt oxide (B-3) having an average particle diameter of 3.2 μm and a tap density of 1.20 g/cm³, prepared in Manufacturing Example 6. The resulting lithium cobalt oxide had an average particle diameter of 13.8 μm, a tap density of 2.65 g/cm³, and a pressed density of 3.72 g/cm³.

Example 10

Lithium cobalt oxide was prepared by uniformly mixing 90 parts by weight of lithium cobalt oxide (A-1) having an average particle diameter of 15.5 μm and a tap density of 2.80 g/cm³, prepared in Manufacturing Example 1, and 10 parts by weight of lithium cobalt oxide (B-1) having an average particle diameter of 7.4 μm and a tap density of 1.80 g/cm³, prepared in Manufacturing Example 4. The resulting lithium cobalt oxide had an average particle diameter of 14.8 μm, a tap density of 2.70 g/cm³, and a pressed density of 3.60 g/cm³.

Example 11

Lithium cobalt oxide was prepared by uniformly mixing 80 parts by weight of lithium cobalt oxide (A-1) having an average particle diameter of 15.5 μm and a tap density of 2.80 g/cm³, prepared in Manufacturing Example 1, and 20 parts by weight of lithium cobalt oxide (B-3) having an average particle diameter of 3.2 μm and a tap density of 1.20 g/cm³, prepared in Manufacturing Example 6. The resulting lithium cobalt oxide had an average particle diameter of 13.2 μm, a tap density of 2.58 g/cm³, and a pressed density of 3.74 g/cm³.

Example 12

Lithium cobalt oxide was prepared by uniformly mixing 80 parts by weight of lithium cobalt oxide (A-1) having an average particle diameter of 15.5 μm and a tap density of 2.80 g/cm³, prepared in Manufacturing Example 1, and 20 parts by weight of lithium cobalt oxide (B-1) having an average particle diameter of 7.4 μm and a tap density of 1.80 g/cm³, prepared in Manufacturing Example 4. The resulting lithium cobalt oxide had an average particle diameter of 13.8 μm, a tap density of 2.62 g/cm³, and a pressed density of 3.58 g/cm³.

The lithium cobalt oxide prepared in the above-described Manufacturing Examples 1 to 12 by mixing the lithium cobalt oxide (A) and (B) are collectively shown in Tables 2 and 3.

TABLE 2

| | (A) Tap density g/cm³ | (B) Tap density g/cm³ | Tap density difference g/cm³ | Mixing ratio A:B | Mixture tap density g/cm³ | Average particle diameter μm |
|---|---|---|---|---|---|---|
| Example 1 | 2.80 A-1 | 1.20 B-3 | 1.60 | 95:5 | 2.75 | 15.0 |
| Example 2 | 2.80 A-1 | 1.20 B-3 | 1.60 | 70:30 | 2.40 | 11.9 |
| Example 3 | 2.80 A-1 | 1.50 B-2 | 1.30 | 70:30 | 2.53 | 12.8 |
| Example 4 | 2.50 A-2 | 1.50 B-2 | 1.00 | 80:20 | 2.40 | 10.5 |
| Example 5 | 2.50 A-2 | 1.80 B-1 | 0.70 | 60:40 | 2.35 | 10.1 |
| Example 6 | 1.90 A-3 | 1.20 B-3 | 0.70 | 85:15 | 1.83 | 7.0 |
| Example 7 | 2.80 A-1 | 1.20 B-3 | 1.60 | 60:40 | 1.88 | 7.8 |
| Example 8 | 2.80 A-1 | 1.18 B-4 | 1.62 | 70:30 | 2.38 | 7.7 |
| Example 9 | 2.80 A-1 | 1.20 B-3 | 1.60 | 90:10 | 2.65 | 13.8 |

TABLE 2-continued

|  | (A) Tap density g/cm$^3$ | (B) Tap density g/cm$^3$ | Tap density difference g/cm$^3$ | Mixing ratio A:B | Mixture tap density g/cm$^3$ | Average particle diameter μm |
|---|---|---|---|---|---|---|
| Example 10 | 2.80 A-1 | 1.80 B-1 | 1.00 | 90:10 | 2.70 | 14.8 |
| Example 11 | 2.80 A-1 | 1.20 B-3 | 1.60 | 80:20 | 2.58 | 13.2 |
| Example 12 | 2.80 A-1 | 1.80 B-1 | 1.00 | 80:20 | 2.62 | 13.8 |

TABLE 3

|  | (A) Pressed density g/cm$^3$ | (B) Pressed density g/cm$^3$ | Pressed density difference g/cm$^3$ | Mixing ratio A:B | Mixture pressed density g/cm$^3$ | Average particle diameter μm |
|---|---|---|---|---|---|---|
| Example 1 | 3.45 A-1 | 3.21 B-3 | 0.24 | 95:5 | 3.65 | 15.0 |
| Example 2 | 3.45 A-1 | 3.21 B-3 | 0.24 | 70:30 | 3.95 | 11.9 |
| Example 3 | 3.45 A-1 | 3.15 B-2 | 0.30 | 70:30 | 3.82 | 12.8 |
| Example 4 | 3.48 A-2 | 3.15 B-2 | 0.33 | 80:20 | 3.75 | 10.5 |
| Example 5 | 3.48 A-2 | 3.20 B-1 | 0.28 | 60:40 | 3.65 | 10.1 |
| Example 6 | 3.41 A-3 | 3.21 B-3 | 0.20 | 85:15 | 3.55 | 7.0 |
| Example 7 | 3.45 A-1 | 3.21 B-3 | 0.24 | 60:40 | 3.50 | 7.8 |
| Example 8 | 3.45 A-1 | 3.19 B-4 | 0.26 | 70:30 | 3.89 | 7.7 |
| Example 9 | 3.45 A-1 | 3.21 B-3 | 0.24 | 90:10 | 3.72 | 13.8 |
| Example 10 | 3.45 A-1 | 3.20 B-1 | 0.25 | 90:10 | 3.60 | 14.8 |
| Example 11 | 3.45 A-1 | 3.21 B-3 | 0.24 | 80:20 | 3.74 | 13.2 |
| Example 12 | 3.45 A-1 | 3.20 B-1 | 0.25 | 80:20 | 3.58 | 13.8 |

(Note) In Tables 2 and 3, A represents lithium cobalt oxide (A), and B represents lithium cobalt oxide (B).

Comparative Example 1

Lithium cobalt oxide (LiCoO$_2$) having an average particle diameter of 12.3 μm, a tap density of 2.50 g/cm$^3$, and a pressed density of 3.48 g/cm$^3$ is shown as a comparative example.

The SEM image of this lithium cobalt oxide indicates that the lithium cobalt oxide (A) is composed of uniformly monodisperse primary particles.

Comparative Examples of lithium cobalt oxide prepared by changing the mixing of the lithium cobalt oxide (A) and the lithium cobalt oxide (B) of the present invention will be described below.

Manufacturing Example 8

Comparative Manufacturing Example

Lithium carbonate and cobalt oxide were mixed in order so that the Li/Co atomic ratio became 1.00 and, thereby, a uniform mixture was prepared. A firing treatment was performed by keeping at 1,000° C. to 1,050° C. for 10 hours. The resulting fired material was ground and classified in the air, so that lithium cobalt oxide (LiCoO$_2$) having an average particle diameter of 4.5 μm, a tap density of 1.60 g/cm$^3$, and a pressed density of 3.25 g/cm$^3$ was prepared.

The resulting lithium cobalt oxide was a lithium cobalt oxide (C-1) composed of uniformly monodisperse primary particles.

Manufacturing Example 9

Comparative Manufacturing Example

Lithium carbonate and cobalt oxide were mixed in order so that the Li/Co atomic ratio became 1.00 and, thereby, a uniform mixture was prepared. A firing treatment was performed by keeping at 800° C. to 850° C. for 10 hours. The resulting fired material was ground and classified in the air, so that lithium cobalt oxide (LiCoO$_2$) having an average particle diameter of 11.0 μm, a tap density of 2.20 g/cm$^3$, and a pressed density of 3.30 g/cm$^3$ was prepared.

The resulting lithium cobalt oxide was a lithium cobalt oxide (C-2) composed of aggregated primary particles.

Manufacturing Example 10

Comparative Manufacturing Example

Lithium carbonate and cobalt oxide were mixed in order so that the Li/Co atomic ratio became 1.00 and, thereby, a uniform mixture was prepared. A firing treatment was performed by keeping at 1,000° C. to 1,050° C. for 10 hours. The resulting fired material was ground and classified in the air, so that lithium cobalt oxide (LiCoO$_2$) having an average particle diameter of 5.0 μm, a tap density of 1.32 g/cm$^3$, and a pressed density of 3.12 g/cm$^3$ was prepared.

The resulting lithium cobalt oxide was a lithium cobalt oxide (C-3) composed of uniformly monodisperse primary particles.

Comparative Example 2

Lithium cobalt oxide was prepared by uniformly mixing 80 parts by weight of lithium cobalt oxide (C-1) prepared in Manufacturing Example 8 and 20 parts by weight of lithium cobalt oxide (B-3) prepared in Manufacturing Example 6 with a small ribbon mixer.

The resulting lithium cobalt oxide had an average particle diameter of 3.5 μm, a tap density of 1.32 g/cm$^3$, and a pressed density of 3.22 g/cm$^3$.

Comparative Example 3

Lithium cobalt oxide was prepared by uniformly mixing 80 parts by weight of lithium cobalt oxide (C-2) prepared in Manufacturing Example 9 and 20 parts by weight of lithium cobalt oxide (B-3) prepared in Manufacturing Example 6 with a small ribbon mixer.

The resulting lithium cobalt oxide had an average particle diameter of 11.2 μm, a tap density of 2.15 g/cm$^3$, and a pressed density of 3.45 g/cm$^3$.

Comparative Example 4

Lithium cobalt oxide was prepared by uniformly mixing 80 parts by weight of lithium cobalt oxide (A-1) prepared in Manufacturing Example 1 and 20 parts by weight of lithium cobalt oxide (C-2) prepared in Manufacturing Example 9 with a small ribbon mixer.

The resulting lithium cobalt oxide had an average particle diameter of 11.2 μm, a tap density of 2.56 g/cm$^3$, and a pressed density of 3.37 g/cm$^3$.

Comparative Example 5

Lithium cobalt oxide was prepared by uniformly mixing 80 parts by weight of lithium cobalt oxide (A-1) prepared in Manufacturing Example 1 and 20 parts by weight of lithium cobalt oxide (C-3) prepared in Manufacturing Example 10 with a small ribbon mixer.

The resulting lithium cobalt oxide had an average particle diameter of 13.4 μm, a tap density of 2.62 g/cm$^3$, and a pressed density of 3.40 g/cm$^3$.

Comparative Example 6

Lithium cobalt oxide was prepared by uniformly mixing 50 parts by weight of lithium cobalt oxide (A-1) prepared in Manufacturing Example 1, and 50 parts by weight of lithium cobalt oxide (B-3) prepared in Manufacturing Example 6 with a small ribbon mixer.

The resulting lithium cobalt oxide had an average particle diameter of 9.5 μm, a tap density of 1.71 g/cm$^3$, and a pressed density of 3.42 g/cm$^3$.

TABLE 4

| | Lithium cobalt oxide | | Average particle diameter (μm) | Tap density (g/cm$^3$) | Pressed density (g/cm$^3$) |
|---|---|---|---|---|---|
| Manufacturing Example 2 | A-2 | Monodispersion | 12.3 | 2.50 | 3.48 |
| Manufacturing Example 8 | C-1 | Monodispersion | 4.5 | 1.60 | 3.25 |
| Manufacturing Example 9 | C-2 | Aggregation | 11.0 | 2.20 | 3.30 |
| Manufacturing Example 10 | C-3 | Monodispersion | 5.0 | 1.32 | 3.12 |

TABLE 5

| | (A) Tap density g/cm$^3$ | (B) Tap density g/cm$^3$ | Tap density difference g/cm$^3$ | Mixing ratio A:B | Mixture tap density g/cm$^3$ | Average particle diameter μm |
|---|---|---|---|---|---|---|
| Comparative Example 1 | 2.50 A-2 | — | — | 100 | 2.50 | 12.3 |
| Comparative Example 2 | 1.60 C-1 | 1.20 B-3 | 0.40 | 80:20 | 1.32 | 3.5 |
| Comparative Example 3 | 2.20 C-2 | 1.20 B-3 | 1.00 | 80:20 | 2.15 | 11.2 |
| Comparative Example 4 | 2.80 A-1 | 2.20 C-2 | 0.60 | 80:20 | 2.56 | 11.2 |
| Comparative Example 5 | 2.80 A-1 | 1.32 C-3 | 1.48 | 80:20 | 2.62 | 13.4 |
| Comparative Example 6 | 2.80 A-1 | 1.20 B-3 | 1.60 | 50:50 | 1.71 | 9.5 |

TABLE 6

| | (A) Pressed density g/cm$^3$ | (B) Pressed density g/cm$^3$ | Pressed density difference g/cm$^3$ | Mixing ratio A:B | Mixture pressed density g/cm$^3$ | Average particle diameter μm |
|---|---|---|---|---|---|---|
| Comparative Example 1 | 3.48 A-2 | — | — | 100 | 3.48 | 12.3 |
| Comparative Example 2 | 3.25 C-1 | 3.21 B-3 | 0.04 | 80:20 | 3.22 | 3.5 |
| Comparative Example 3 | 3.30 C-2 | 3.21 B-3 | 0.09 | 80:20 | 3.45 | 11.2 |
| Comparative Example 4 | 3.45 A-1 | 3.30 C-2 | 0.15 | 80:20 | 3.37 | 11.2 |
| Comparative Example 5 | 3.45 A-1 | 3.12 C-3 | 0.33 | 80:20 | 3.40 | 13.4 |
| Comparative Example 6 | 3.45 A-1 | 3.21 B-3 | 0.24 | 50:50 | 3.42 | 9.5 |

The results of the evaluation of safety and the quick charge-discharge tests of secondary batteries in which the lithium cobalt oxide of the present invention is used as the cathode active material will be described below.

(Evaluation of Safety)

Each of the lithium cobalt oxides in Example 2 and the lithium cobalt oxide (A) of Comparative Example 1 was used as a cathode active material. The cathode active material was applied on an aluminum foil. The resulting cathode plate was used, and a lithium ion secondary battery was prepared through the use of various elements, e.g., a separator, an anode, a cathode, a current collector, mounting fittings, external terminals, and an electrolytic solution. Among them, metal lithium was used as the anode, and a solution prepared by dissolving 1 mol of LiPF$_6$ into 1 liter of mixed solution of ethylene carbonate (EC) and methyl ethyl carbonate (MEC) in a 1:1 mixing ratio was used as the electrolytic solution. After a battery was prepared, charging was performed at 4.3 V versus Li/Li$^+$, and adequate cleaning was performed with acetone, followed by drying. The resulting electrode was hermetically sealed in a vessel together with the mixed solution of ethylene carbonate (EC) and methyl ethyl carbonate (MEC) in a 1:1 mixing ratio, which was used for the electrolytic solution. Subsequently, the thermal stability test was performed based on a DSC measurement. The results thereof are shown in FIG. 3.

Figure 3:
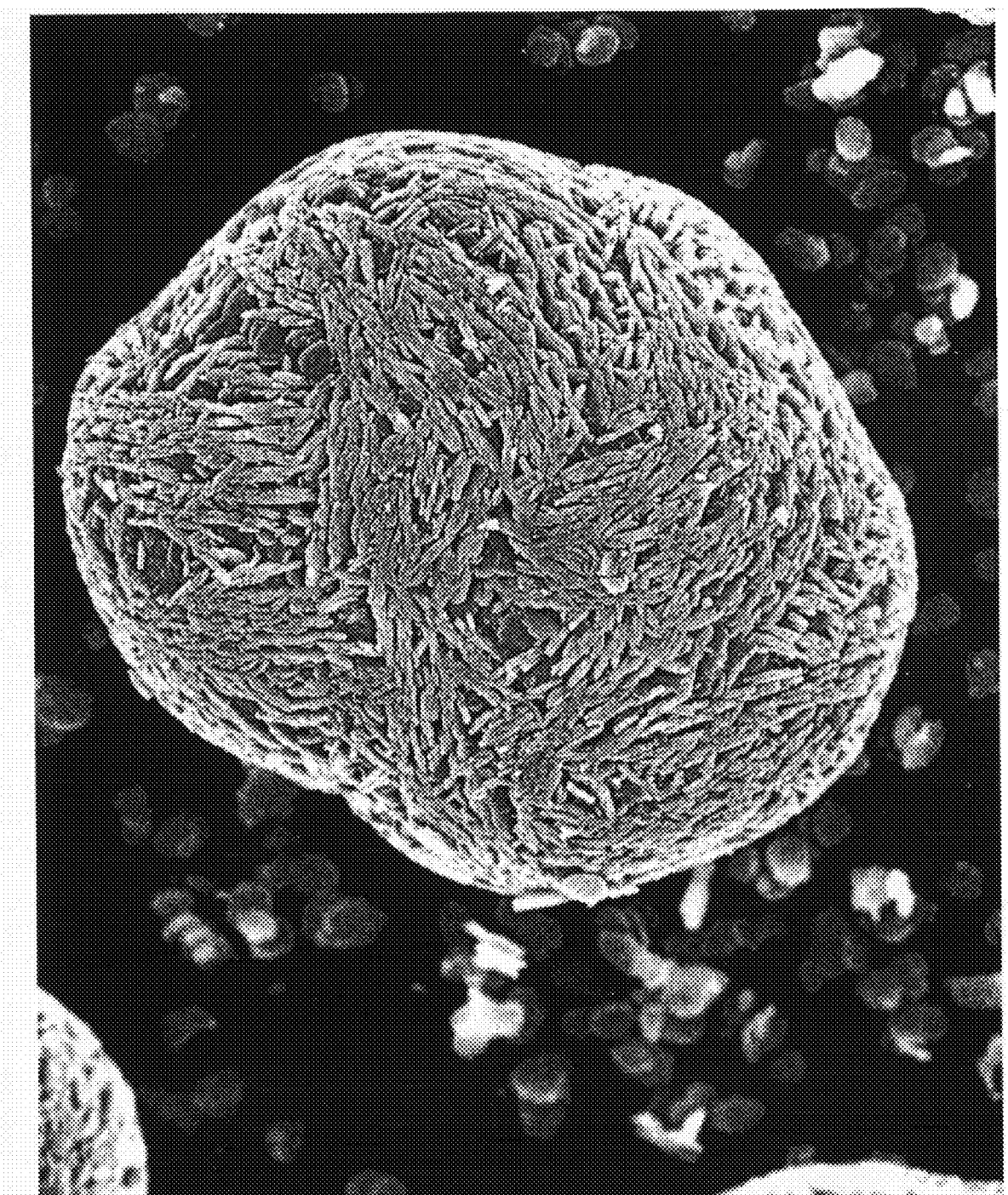
FIG. 3 is a diagram showing the evaluation of safety of the secondary batteries in which the lithium cobalt oxide in Example 2 and that in Comparative Example 1 are used as respective cathode active materials.

As is clear from the results shown in FIG. 3, the first exothermic peak (lower temperature side is approximately 180° C.) of Example 2 is smaller than the first exothermic peak (lower temperature side is approximately 180° C.) of Comparative Example 1 and, therefore, the heating value is small. Consequently, it is clear that the active material of Example 2 exhibits a higher degree of safety compared with the active material of Comparative Example 1. In general, fine particles have a large specific surface area and high reactivity and, therefore, exhibit low degree of safety. However, since coarse particles (lithium cobalt oxide (A)) coexist in the lithium cobalt oxide of Example 2, it is estimated that the high degree of safety of the coarse particles canceled the low degree of safety of the fine particles (lithium cobalt oxide (B)), and this effect contributed to the above-described result.

(Quick Charge-Discharge Test)

Each of the lithium cobalt oxide in Example 2 and the lithium cobalt oxide (A) of Comparative Example 1 was used as a cathode active material. The cathode active material was applied on an aluminum foil. The resulting cathode plate was used, and a lithium ion secondary battery was prepared through the use of various elements, e.g., a separator, an anode, a cathode, a current collector, mounting fittings, external terminals, and an electrolytic solution. Among them, metal lithium was used as the anode, and a solution prepared by dissolving 1 mol of LiPF$_6$ into 1 liter of mixed solution of ethylene carbonate (EC) and methyl ethyl carbonate (MEC) in a 1:1 mixing ratio was used as the electrolytic solution.

Figure 4:
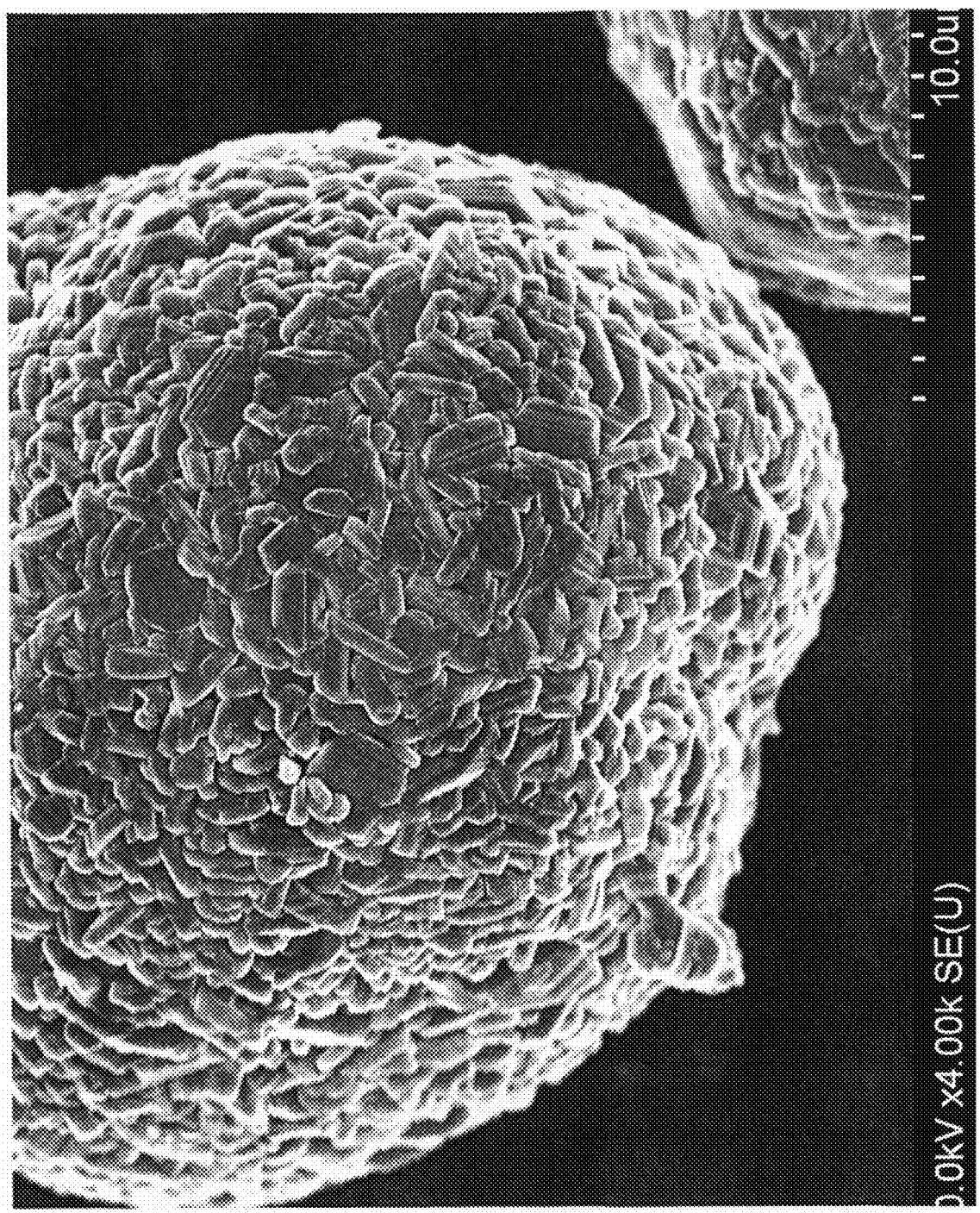
FIG. 4 is a diagram showing the results of quick charge-discharge tests of secondary batteries in which the lithium cobalt oxide in Example 2 and that in Comparative Example 1 are used as respective cathode active materials.
Figure 1:
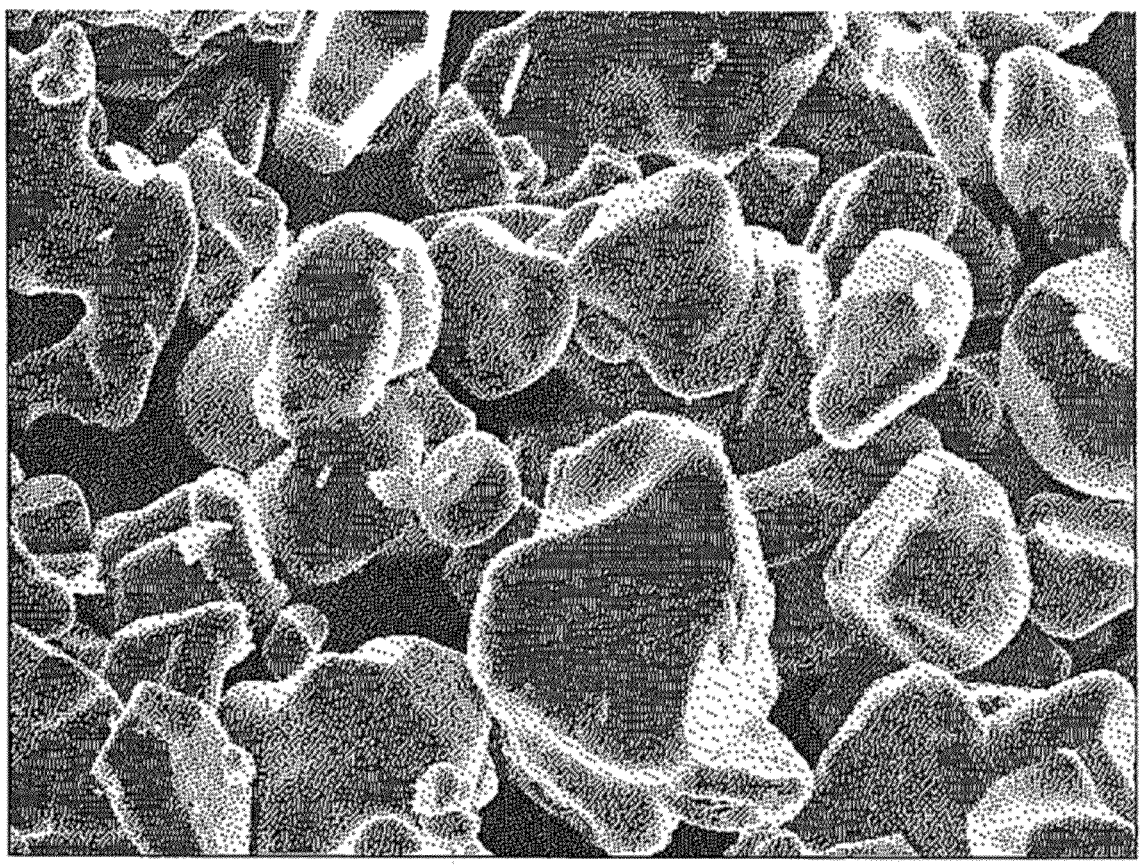
Figure 2:
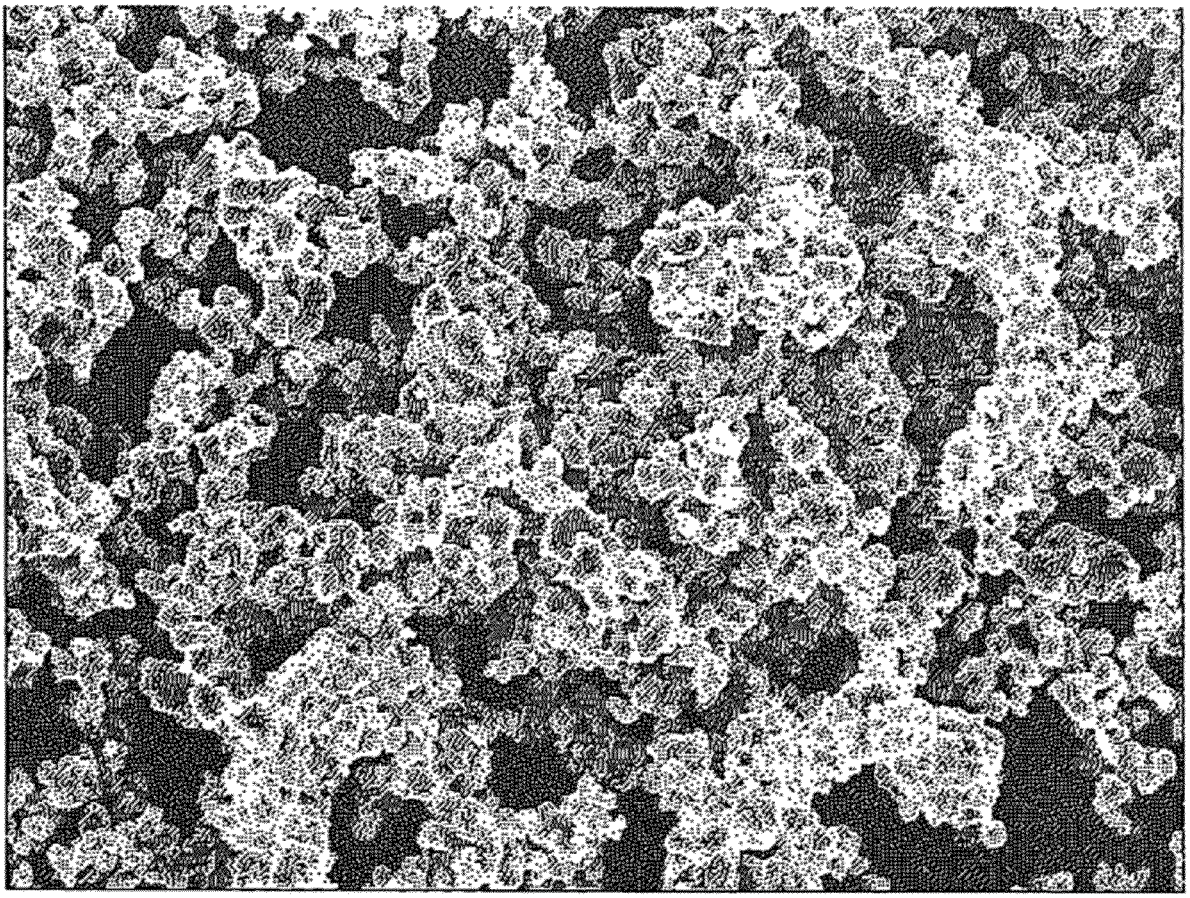
Figure 3:
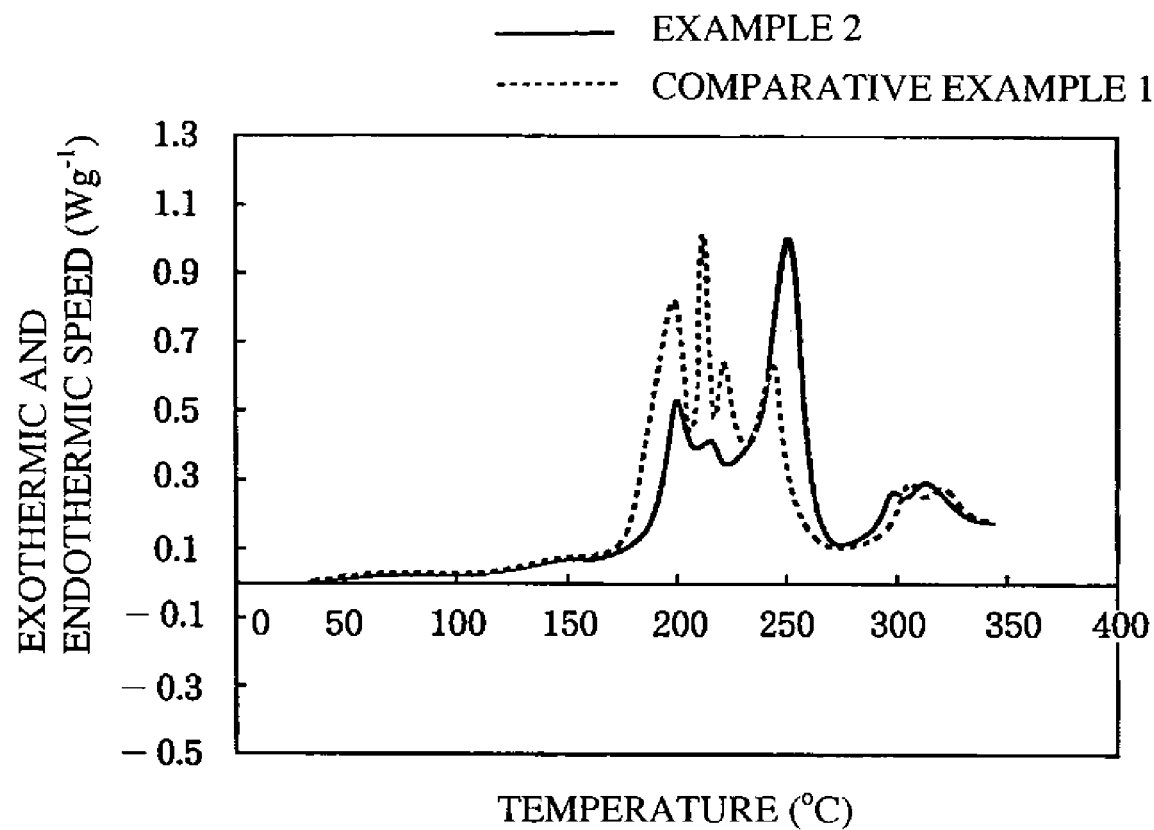
Figure 4:
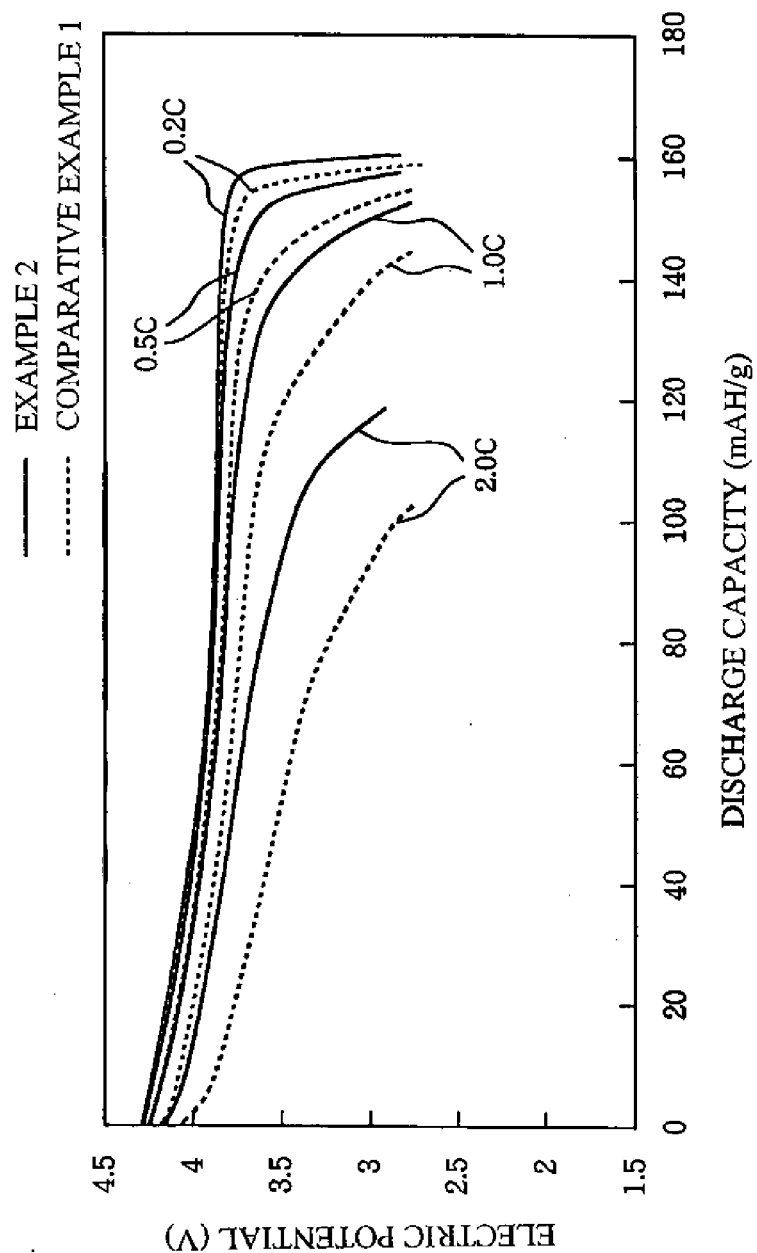

A constant-current charge-discharge test was performed at 2.7 V to 4.3 V (vs. Li/Li$^+$), and the resulting charge-discharge curve is shown in FIG. 4. At that time, the current value was increased as 0.2 C→0.5 C→1.0 C→2.0 C (1.0 C→discharge over 1 hour, 2.0 C→discharge over 0.5 hours), and the quick charge-discharge performance was tested. The cathode and the anode were metal Li, the electrolytic solution was 1 M LiPF$_6$/(EC+MEC), the charging system was CCCV (0.5 C, 5 H), and the scanning potentials were 2.7 V and 4.3 V.

As is clear from the results shown in FIG. 4, the capacity of Example 2, which can be taken out, is larger than that of Comparative Example 1. The reason is estimated that the fine particles (lithium cobalt oxide (B)) contained in the lithium cobalt oxide of Example 2 had outstanding quick charge-discharge performance and, thereby, excellent properties were exhibited.

Large particles contribute to the high degree of safety. Small particles enter gaps between large particles and, thereby, high quick charge-discharge performance can be achieved due to an increase in the conductivity between particles. However, if the pressed density is too high (at least 4.0), the electrode density of the resulting electrode is excessively increased, the electrode is not adequately impregnated with the electrolytic solution and, thereby, the quick charge-discharge performance improperly deteriorates. If the pressed density and the tap density are improper values, satisfactory electrode density cannot be achieved.

The pressed density of the lithium cobalt oxide in the present invention will be described below.

The lithium cobalt oxide of the present invention is a mixture of the lithium cobalt oxide (A) composed of monodisperse primary particles and the lithium cobalt oxide (B) composed of aggregated primary particles, and the mixture has a tap density of at least 1.7 g/cm$^3$ and a pressed density of 3.5 to 4.0 g/cm$^3$.

In a preferred embodiment of the above-described lithium cobalt oxide of the present invention, preferably, the lithium cobalt oxide is a mixture of the lithium cobalt oxide (A) having a tap density of 1.7 to 3.0 g/cm$^3$ and a pressed density of 3.3 to 3.7 g/cm$^3$ and the lithium cobalt oxide (B) having a tap density of 1.0 to 2.0 g/cm$^3$ and a pressed density of 3.1 to 3.5 g/cm$^3$, and the difference in tap density between the lithium cobalt oxide (A) and the lithium cobalt oxide (B) is at least 0.20 g/cm$^3$, and the difference in pressed density therebetween is at least 0.1 g/cm$^3$.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. Lithium cobalt oxide comprising:
   a mixture of lithium cobalt oxide particles (A) and lithium cobalt oxide particles (B);
   wherein the lithium cobalt oxide particles (A) are composed of uniformly monodisperse particles, which refers to particles present independently of each other, and the lithium cobalt oxide particles (A) have an average particle diameter in a range of 5 to 30 μm;
   the lithium cobalt oxide particles (B) are composed of an aggregation of primary particles forming a secondary particle, and the secondary particles have an average particle diameter in a range of 0.1 to 10 μm; and
   wherein a tap density of the mixture of the lithium cobalt oxide particles (A) and the lithium cobalt oxide particles (B) is at least 1.7 g/cm$^3$, and a pressed density of the mixture of the lithium cobalt oxide particles (A) and the lithium cobalt oxide particles (B) is 3.5 to 4.0 g/cm$^3$.

2. The lithium cobalt oxide according to claim 1, wherein the tap density of the mixture of the lithium cobalt oxide (A) and the lithium cobalt oxide particles (B) is at least 2.0 g/cm$^3$ and the pressed density of the mixture of the lithium cobalt oxide (A) and the lithium cobalt oxide particles (B) is 3.6 to 4.0 g/cm$^3$.

3. The lithium cobalt oxide according to claim 1, wherein the tap density of the mixture of the lithium cobalt oxide (A) and the lithium cobalt oxide particles (B) is 2.5 to 3.5 g/cm$^3$ and the pressed density of the mixture of the lithium cobalt oxide (A) and the lithium cobalt oxide particles (B) is 3.7 to 4.0 g/cm$^3$.

4. The lithium cobalt oxide according to claim 1, wherein an average particle diameter of the lithium cobalt oxide particles (B) is smaller than an average particle diameter of the lithium cobalt oxide particles (A) in the mixture of the lithium cobalt oxide particles (A) and the lithium cobalt oxide particles (B).

5. A nonaqueous electrolyte secondary battery comprising a cathode plate having a cathode active material, wherein the cathode active material includes a mixture of lithium cobalt oxide particles (A) and lithium cobalt oxide particles (B);
   the lithium cobalt oxide particles (A) are composed of uniformly monodisperse particles, which refers to particles present independently of each other, and the lithium cobalt oxide particles (A) have an average particle diameter in a range of 5 to 30 μm;
   the lithium cobalt oxide particles (B) are composed of an aggregation of primary particles forming a secondary particle, and the secondary particles have an average particle diameter in a range of 0.1 to 10 μm; and
   wherein a tap density of the mixture of the lithium cobalt oxide particles (A) and the lithium cobalt oxide particles (B) is at least 1.7 g/cm$^3$, and a pressed density of the mixture of the lithium cobalt oxide particles (A) and the lithium cobalt oxide particles (B) is 3.5 to 4.0 g/cm$^3$.

6. The nonaqueous electrolyte secondary battery according to claim 5, wherein a ratio of the mixture of the lithium cobalt oxide particles (A) and the lithium cobalt oxide particles (B) is (A):(B)=95:5 to 60:40 on a weight basis.

7. The nonaqueous electrolyte secondary battery according to claim 5, wherein a ratio of the mixture of the lithium cobalt oxide particles (A) and the lithium cobalt oxide particles (B) is (A):(B)=90:10 to 80:20 on a weight basis.

8. The nonaqueous electrolyte secondary battery according to claim 5, wherein the average particle diameter of the lithium cobalt oxide particles (A) is within the range of 10 to 20 μm.

9. The nonaqueous electrolyte secondary battery according to claim 5, wherein the average particle diameter of the lithium cobalt oxide particles (B) is within the range of 2.0 to 8.0 μm.

10. The nonaqueous electrolyte secondary battery according to claim 5, wherein the pressed density of the mixture of the lithium cobalt oxide particles (A) and the lithium cobalt oxide particles (B) is 3.6 to 4.0 g/cm$^3$.

11. The nonaqueous electrolyte secondary battery according to claim 5, wherein the pressed density of the mixture of the lithium cobalt oxide particles (A) and the lithium cobalt oxide particles (B) is 3.7 to 4.0 g/cm$^3$.

12. The nonaqueous electrolyte secondary battery according to claim 5, wherein the tap density of the mixture of the lithium cobalt oxide particles (A) and the lithium cobalt oxide particles (B) is 2.0 to 3.0 g/cm$^3$.

13. The nonaqueous electrolyte secondary battery according to claim 5, wherein an average particle diameter of the lithium cobalt oxide particles (B) is smaller than an average particle diameter of the lithium cobalt oxide particles (A) in the mixture of the lithium cobalt oxide particles (A) and the lithium cobalt oxide particles (B).

* * * * *

UNITED STATES PATENT AND TRADEMARK OFFICE
CERTIFICATE OF CORRECTION

PATENT NO.         : 7,547,492 B2                                Page 1 of 5
APPLICATION NO.    : 10/860611
DATED              : June 16, 2009
INVENTOR(S)        : Hidekazu Awano et al.

It is certified that error appears in the above-identified patent and that said Letters Patent is hereby corrected as shown below:

In the Drawings

Replace the drawings with Figs. 1-4 as attached.

Signed and Sealed this
Thirty-first Day of May, 2016

Michelle K. Lee
*Director of the United States Patent and Trademark Office*